United States Patent [19]
Strauss et al.

[11] 3,836,400
[45] Sept. 17, 1974

[54] DRY BATTERY SEAL AND TERMINAL CONNECTION

[75] Inventors: Howard J. Strauss, Bloomington, Minn.; Edward S. Hill, Wickliffe, Ohio

[73] Assignee: Gould Inc., Mendota Heights, Minn.

[22] Filed: Sept. 1, 1971

[21] Appl. No.: 176,940

[52] U.S. Cl. .............................................. 136/133
[51] Int. Cl. ............................................ H01m 1/02
[58] Field of Search .......... 136/133, 167, 169, 170; 215/40

[56] References Cited
UNITED STATES PATENTS
3,016,414   1/1962   Priebe................................ 136/169
3,143,441   8/1964   Coleman et al..................... 136/178
3,663,301   5/1972   Ralston et al..................... 136/169 X

*Primary Examiner*—A. B. Curtis
*Assistant Examiner*—H. A. Feeley
*Attorney, Agent, or Firm*—Howard H. Darbo

[57] ABSTRACT

In a cylindrical dry cell, the cathode body comprising depolarizing material and electrolyte is completely isolated from the anode compartment by a sealing gasket which engages a generally washer-shaped subseal which fits snugly in the cylindrical can and holds down the end portion of the paper separator which covers the cathode. The subseal also serves to prevent creepage of alkaline electrolyte solution to the cell sealing surfaces at the open end of the can. The gasket may also serve to continuously press the current collector against the terminal diaphragm of the cell for dependable electrical engagement therewith.

4 Claims, 4 Drawing Figures

PATENTED SEP 17 1974 3,836,400

DRY BATTERY SEAL AND TERMINAL CONNECTION

BACKGROUND AND SUMMARY OF THE INVENTION

Dry cells having alkaline electrolytes and anode bodies of the slurry type present special problems which must be met to ensure the production of a satisfactory cell. Innovative measures must be taken to avoid the consequences of the tendency of the alkaline electrolyte solution to creep along the surfaces of the metal can which might otherwise prevent the proper sealing of the cell. If not dependably separated, movement or growth of the anode slurry can result in the internal short circuiting of the cell. The problem of electrical connection of the external negative terminal with the anode body is an ever present one and many more or less costly and dependable arrangements have been suggested for this purpose.

The principal object of the invention is to provide dependable structural separation between the cathode and the anode of a cylindrical dry cell having an alkaline electrolyte and an anode of the slurry type. To this end, a subseal is provided which fits snugly within the cell, holding the out-turned end of the paper separator in position covering the top of the cathode body. A cell seal gasket has a truncated conical portion which converges downwardly and engages the subseal to close off any communication between the cathode and anode compartments of the cell.

A further object of the invention is to provide means for continuously pressing the anode current collector upwardly against the underside of the terminal diaphragm of the cell to ensure good and dependable electrical connection therewith. The desired pressure is provided by an auxiliary but integral part of the seal gasket which may be stressed and loaded like a spring in the assembly of the cell and/or which may be urged upwardly against the diaphragm by the subseal pressing against the auxiliary gasket structure.

DESCRIPTION OF THE DRAWING

In the accompanying drawing.

DESCRIPTION OF SPECIFIC EMBODIMENTS

Figure 1:
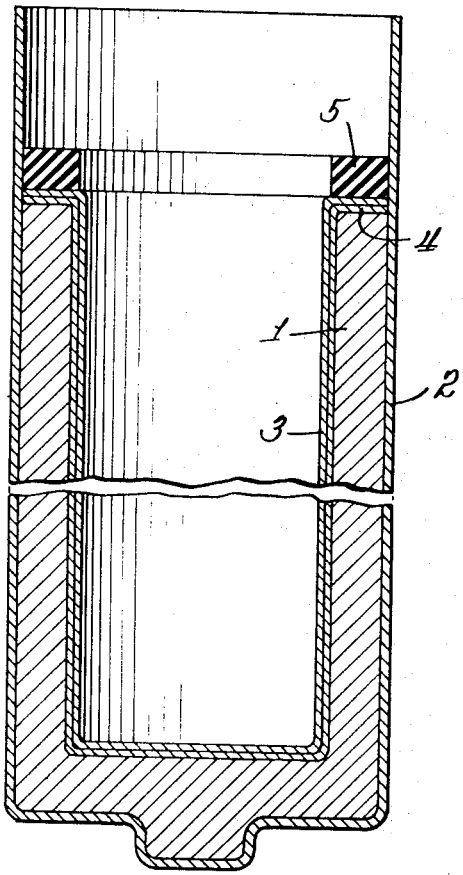
FIG. 1 is a cross-sectional view of a can-cathode subassembly with the subseal in position.
Figure 2:
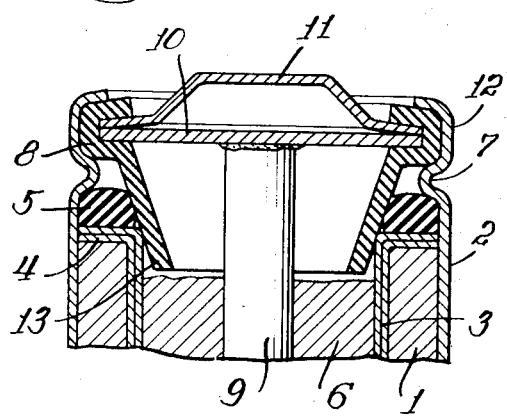
FIG. 2 is a cross-sectional view of the upper portion of a cell showing the structure for separating the cathode and anode compartments.

Except for the novel subsealing arrangement, the dry cell illustrated in FIGS. 1 and 2 are of known construction. The top seal and venting arrangement is essentially shown in U.S. Pat. No. 3,143,441.

The cell is manufactured by first producing the cathodecan assembly illustrated in FIG. 1. The annular cathode body 1 of depolarizing material is inserted into steel can 2 and a separator 3 of paper or other suitable material is positioned to cover interior surfaces of the cathode. The separator may be formed as the sheet material is inserted into the cell or may be preformed, as desired. In either case, the top portion 4 of the separator is turned to extend radially outwardly to cover the top of the cathode body 1. Preferably the separator extends to the can, as shown. Subseal washer 5 of a suitable semi-rigid, moderately resilient material such as polyethylene, is seated snugly in the can upon the outturned portions 4 of the separator.

The sub-assembly thus formed is ready for insertion of the balance of the active materials of the cell, provision for negative terminal connections and the closing and sealing of the cell.

After insertion of the proper quantity of alkaline electrolyte, e.g., potassium hydroxide dissolved in water and a small proportion of zinc oxide, the anode slurry 6 is placed in the cell. If the can was not crimped at 7 following insertion of subseal washer 5, it may be crimped at this stage of manufacture after which gasket 8, current collector 9 with diaphragm 10 and cap 11 are placed in position. The cell is then closed and permanently sealed by applying radial pressure to the top portion 12 of the can and crimping the edge portions of the gasket and can in upon the periphery of cap 11. The cell, so sealed, is ready for service.

The truncated conical bottom portion 13 of gasket 8 and the cathode subseal washer 5 are dimensioned and formed to mutually engage at the inner periphery of washer 5 as shown. This resilient but firm contact positively separates the anode compartment of the cell from any possible communication with the cathode. No part of the anode slurry can escape to short circuit the cell.

Figure 3:
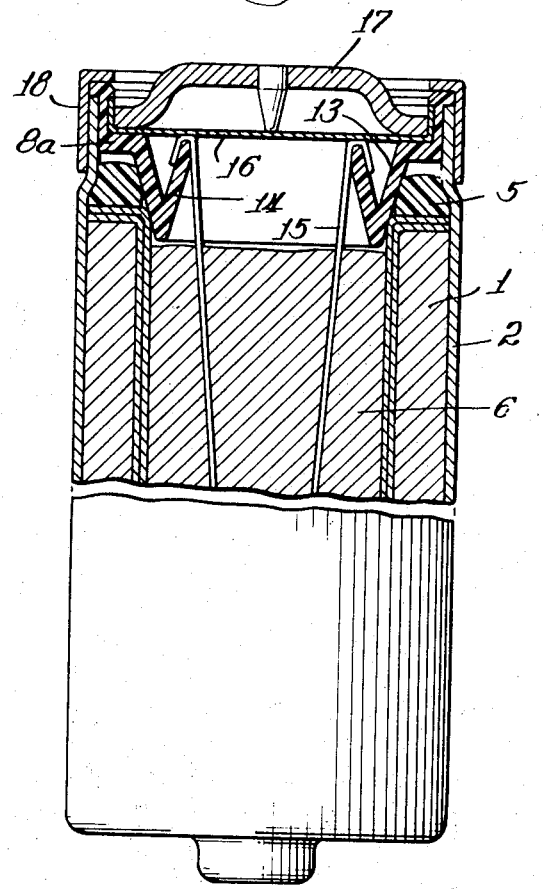
FIG. 3 is a cross-sectional view of a cell showing an alternative construction.

In the cell illustrated in FIG. 3, an additional, reentrant truncated conical section 14 is provided as an integral part of gasket 8a. The top edge of conical section 14 engages the ends of U-shaped current collector 15, providing contact pressure necessary for dependable electrical connection of the current collector with diaphragm 16 which, in turn, is in electrical contact with cap 17 which serves as the negative terminal of the cell. The cell is closed and permanently sealed by inward radial compression of the top portion of the can and the application of steel ring 18 to ensure enduring sealing pressure.

As has been described with reference to the cell of FIGS. 1 and 2, truncated conical section 13 of gasket 8a engages the inner periphery of subseal washer 5 to close off the anode compartment from any possible passage of any part of the anode slurry to the cathode.

Figure 4:
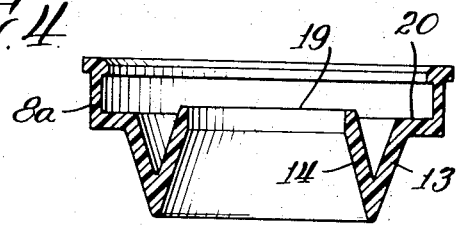
FIG. 4 is a cross-sectional view of the seal gasket of the cell of FIG. 3.

The preferred form of gasket is shown separately in FIG. 4. In this normal, unstressed configuration, the upper edge 19 is in a plane above that of shoulder 20 which latter establishes the level of the bottom surface of diaphragm 16. When the cell is assembled, diaphragm 16 is forced downwardly to seat upon shoulder 20 against the opposing force of gasket section 14. The result is a pressure contact of substantial magnitude between the hook ends of anode collector 15 and diaphragm 16.

Since nylon may be provided as a relatively hard and stiff plastic resistant to cold flow under continuing stress, this material is preferably used in the manufacture of gasket 8a.

This desirable electrical contact pressure is augmented by the resilient pressure applied to section 13 of the gasket by the resilient subseal washer 5. As the gasket is forced down against washer 5 to provide the closure engagement above described, the resilient pressure of the washer tends to urge section 13, and therefore section 14, of the gasket inwardly and upwardly. Thus, a continuing pressure is provided to ensure the necessary electrical contact pressure between the current collector and diaphragm 16 even though cold flow of the nylon material over a period of time may result in some relaxing of the pressure initially provided by the stressing of the gasket structure.

It should be noted that although gasket 8a is shown and described as having the re-entrant conical section sufficiently long to extend, in normal unstressed condition, to a plane above that of the shoulder 20, this is not an indispensable feature of construction since the pressure exerted by the subseal washer 5 against section 13 of the gasket is capable of providing the desired pressure of the current collector 15 against the diaphragm 16 without the above-described prestressing of the gasket structure.

We claim:

1. In an electric dry cell comprising a cylindrical steel can, an annular cathode body of depolarizing material at the internal surface of the can and extending upwardly from the bottom of the can to a level spaced from the top of the can, a separator saturated with alkaline electrolyte and covering the inner surface including the top of the body of depolarizing material and defining an inner anode compartment containing an anode slurry, and a cell closure and terminal structure, the improvement thereof wherein the portion of the separator which covers the top of the cathode body extends substantially to the can and a semi-rigid moderately resilient subseal washer is snugly seated within the can on top of and engaging the portion of the separator which extends over the top of the body of depolarizing material, and the closure structure includes a stiffly flexible gasket having an integral frustro-conical section extending downwardly from the top of the cell and firmly and resiliently engaging said subseal washer throughout its inner periphery to provide a barrier to the passage of any anode slurry material from the inner anode compartment of the call to the region of the cell seal.

2. Structure in accordance with claim 1 wherein the cell includes a slurry type anode and a current collector and the closure structure includes a metallic terminal diaphragm engaged by the end of said current collector, the improvement thereof wherein the gasket is provided with an intagral frustro-conical re-entrant section extending upwardly and inwardly from the first-maintained frustro-conical section, said re-entrant section engaging the end of the current collector, said frustro-conical sections of said gasket being under stress in the cell structure to continuously urge the end of said current collector upwardly against the terminal diaphragm to ensure electrical connection therewith.

3. Structure in accordance with claim 2 wherein the terminal diaphragm is generally planar and the normal unstressed re-entrant section of the gasket extends upwardly to a level above the normal level of the diaphragm in the assembled cell whereby the frustro-conical sections of the gasket are distorted and placed under stress when the diaphragm is placed thereover and moved down to its normal level.

4 In an electric dry cell comprising a cylindrical can, a slurry type anode, a cell closure and terminal structure including a gasket and a terminal diaphragm, and a current collector immersed in the anode slurry and having hook ends engaging the diaphragm, the improvement wherein the gasket is generally annular and is composed of a stiff plastic material resistant to cold flow and comprises an integral portion extending first downwardly and inwardly and then re-entrantly upwardly and inwardly to a circular end, the hook ends of the current collector being hooked over said circular end of said gasket, said gasket being distorted and under stress in the assembled cell whereby to continuously press the hook ends of the current collector against the diaphragm for electrical contact therewith.

* * * * *